United States Patent [19]

Hemens

[11] 4,014,281
[45] Mar. 29, 1977

[54] STEERING UNIT

[75] Inventor: James Frederick Hemens, Billericay, England

[73] Assignee: Teleflex Morse Limited, Basildon, England

[22] Filed: Mar. 17, 1975

[21] Appl. No.: 558,752

Related U.S. Application Data

[62] Division of Ser. No. 504,483, Sept. 10, 1974, Pat. No. 3,954,022.

[52] U.S. Cl. ............................... 114/144 R; 74/480 B; 74/496; 74/505; 114/160; 115/18 R
[51] Int. Cl.² ................................................. B63H 25/10
[58] Field of Search ............... 114/144 R, 160, 162; 115/18 R; 74/501 R, 480 B, 505, 496

[56] References Cited
UNITED STATES PATENTS

| | | | |
|---|---|---|---|
| 367,771 | 8/1887 | Witmer | 114/163 |
| 2,890,595 | 6/1959 | Loeffler | 74/505 X |
| 2,971,489 | 2/1961 | Loser, Jr. | 74/480 B X |
| 3,135,130 | 6/1964 | Bentley | 115/18 R X |
| 3,203,390 | 8/1965 | Boda | 114/144 R X |
| 3,208,300 | 9/1965 | Morse | 114/144 R |
| 3,766,801 | 10/1973 | Wiegand | 74/496 X |

Primary Examiner—Trygve M. Blix
Assistant Examiner—Sherman D. Basinger
Attorney, Agent, or Firm—James C. Wray

[57] ABSTRACT

A ship's steering unit comprising a housing, a cable wheel mounted within the housing, a shaft with a pinion thereon in driving engagement with the cable wheel, and a one-piece body which serves as a bearing support for the shaft, the shaft having a shroud portion providing a member for mounting the unit to a support surface, which when the unit is orientated with its housing lowermost is spaced below the upper region of the shaft and the bearing support therefor.

14 Claims, 18 Drawing Figures

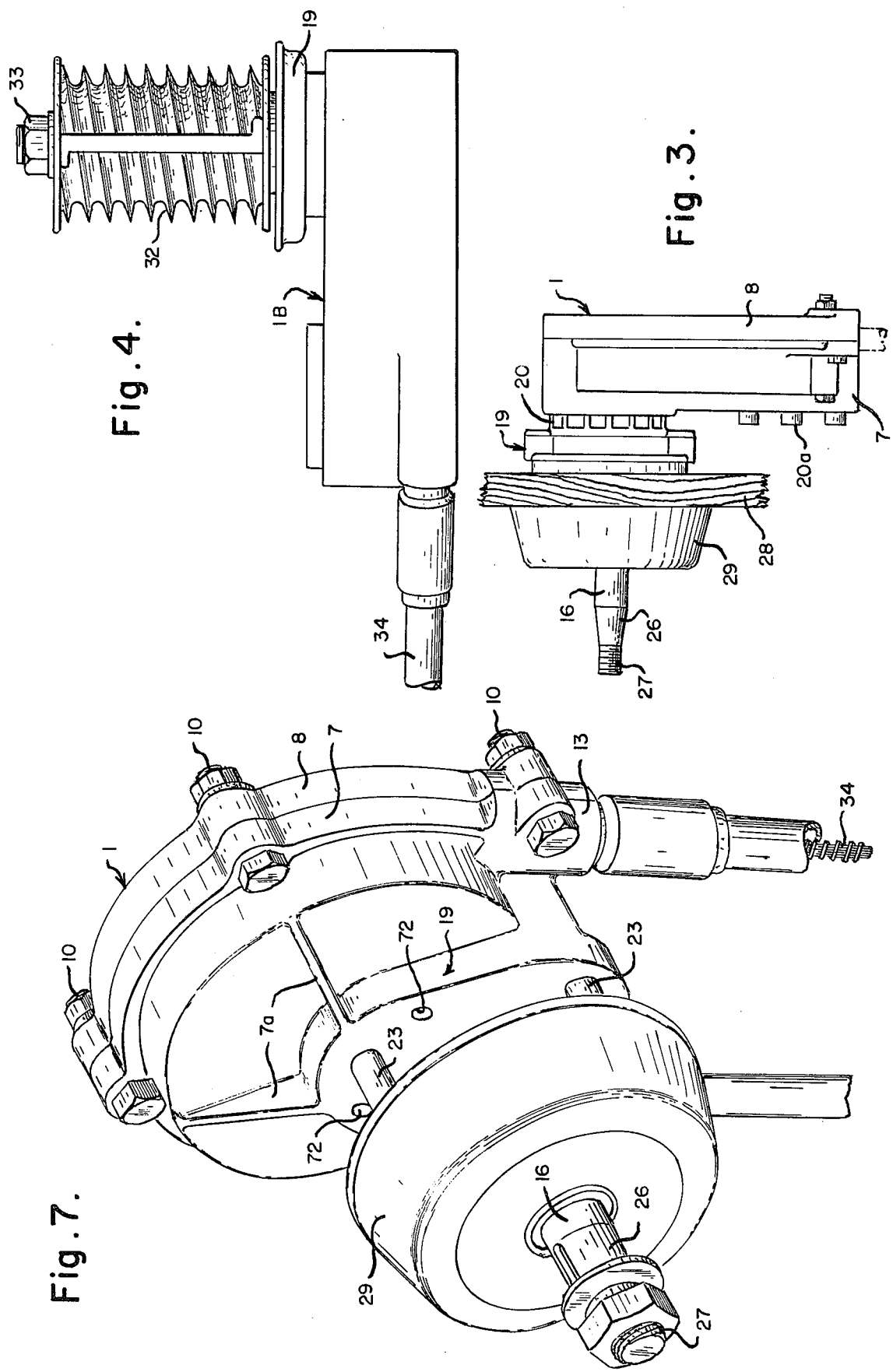

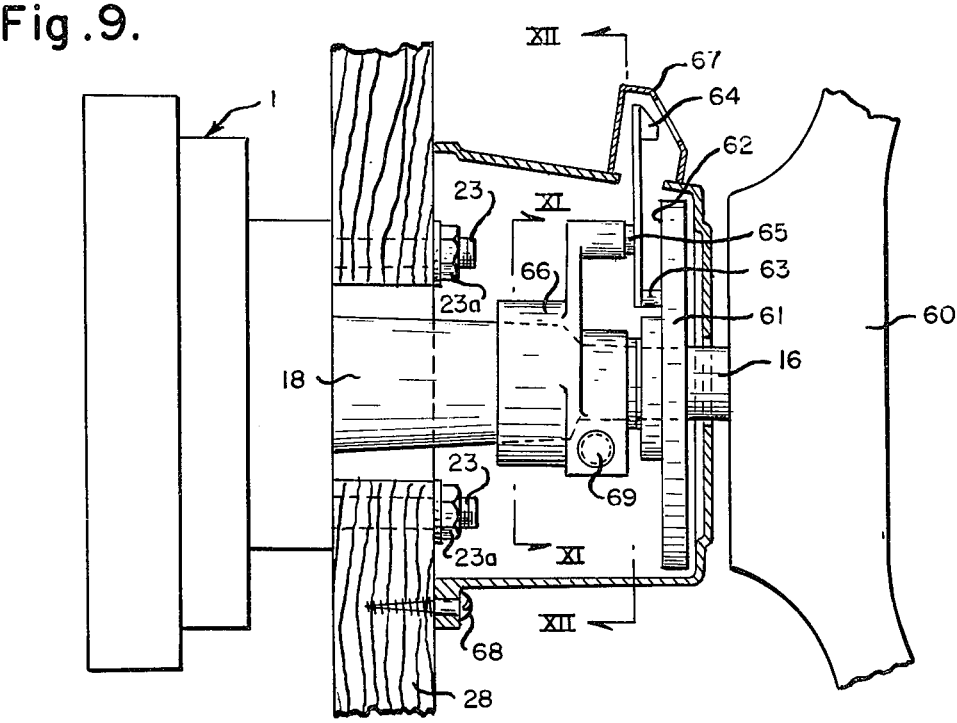
Fig. 9.
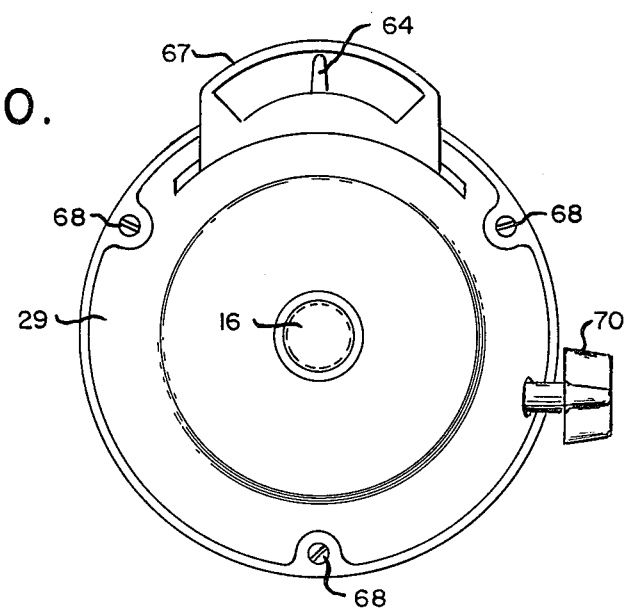
Fig. 10.
Fig. 12.
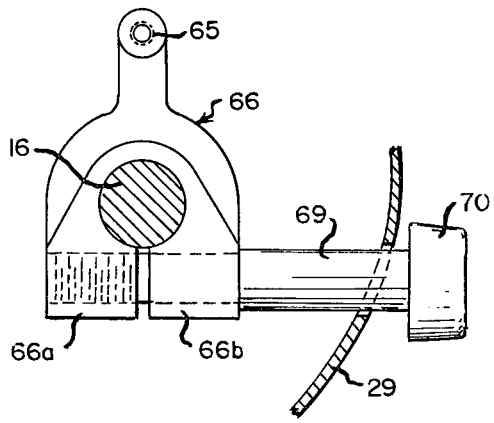
Fig. 11.
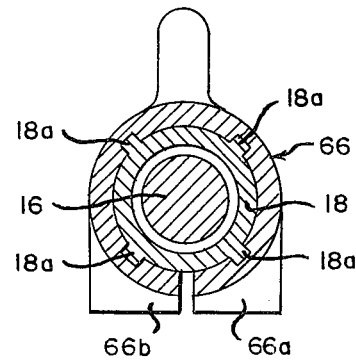

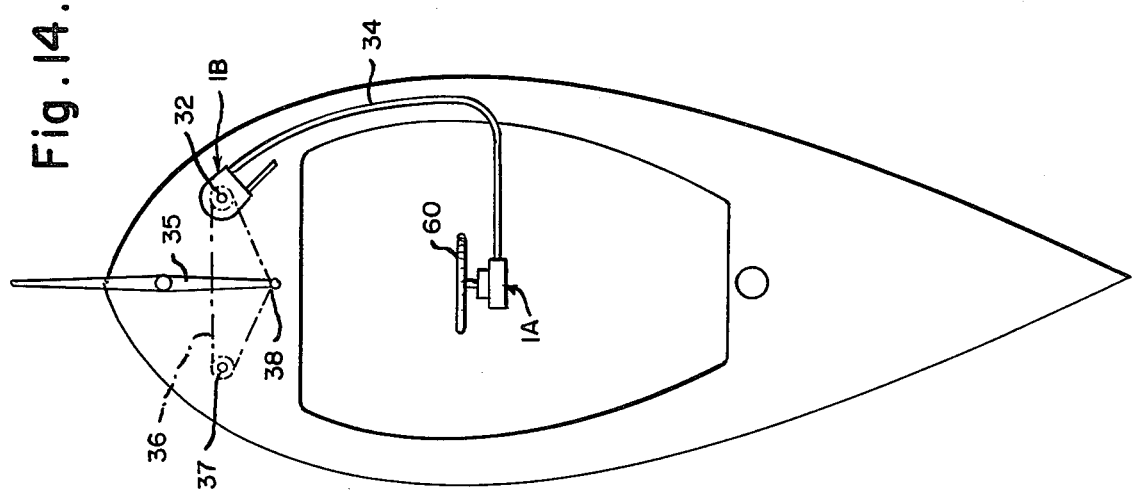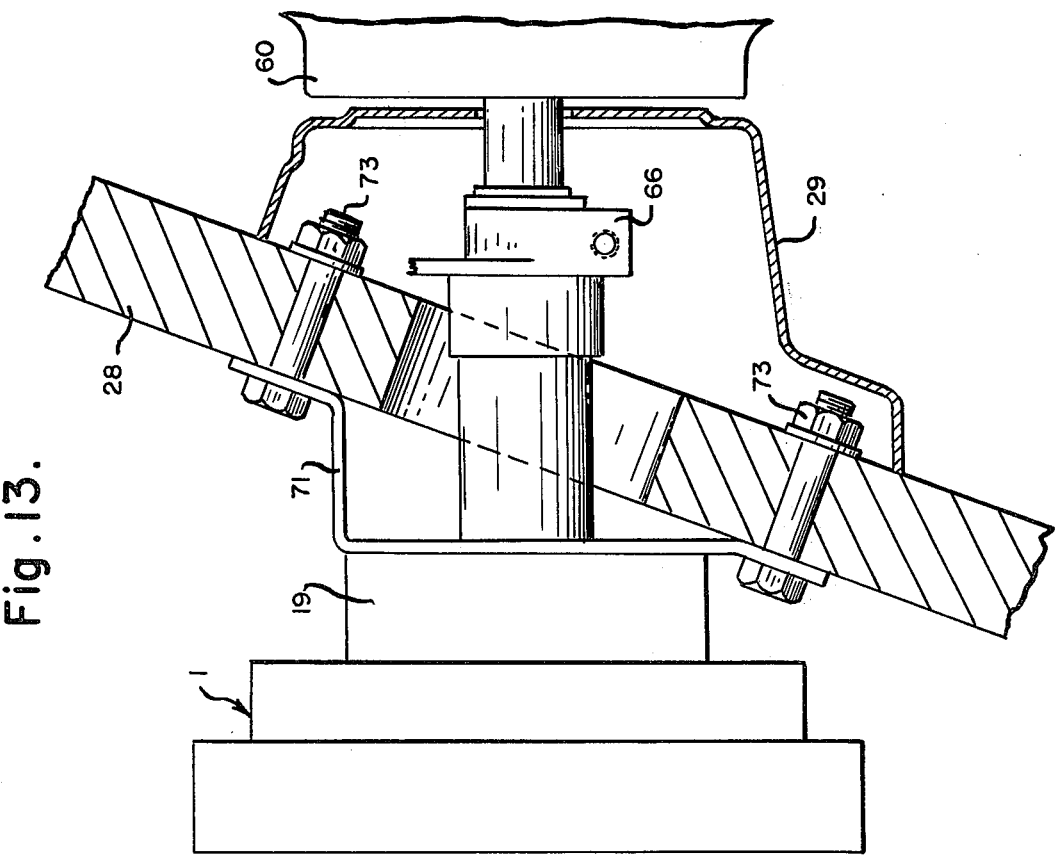

STEERING UNIT

This is a division of application Ser. No. 504,483, filed Sept. 10, 1974, and now U.S. Pat. No. 3,954,022.

This invention relates to motion transmitting systems, and has particular, but not exclusive, reference to marine craft steering systems employed with a push-pull cable mechanism to transmit steerage motion to the tiller of a boat.

We have recently developed a steering head comprising a housing, a cable wheel rotatably mounted within that housing, a shaft with a pinion thereon which makes driving engagement with the cable wheel, and a one-piece body which serves as a bearing support for the shaft and which also has a shroud portion adapted for mounting on and fixture to a support surface (the dashboard or instrument panel in the case of a marine craft).

We have now developed a modified (and heavier duty) version of such steering head in which the shroud portion of the one-piece body is so fashioned that it can be mounted at the rear (rather than the front, as with our previous steering head) of the dashboard. Such a facility is advantageous in that it lends itself to easier assembly of the steering head to the marine craft in production, and constitutes one feature of the present invention (whose scope is defined in the appended claims).

The novel one-piece body is also advantageous in that the bearing support portion thereof (which is formed as a horn) permits the assembly to the shaft (in place of a steering wheel) of a wire drum. The resulting structure, which may be termed a cable drive box, can be used in conjunction with one or more modified steering heads and in proximity to the unit or units to be driven to impart drive thereto by means of a cable. Such a drive system constitutes another feature of the invention.

A cable drive box employing a wire drum and positioned as aforesaid but not necessarily constructed in the manner of the described modified steering head also constitutes a feature of the invention, in conjunction with a steering head again not necessarily constructed as described but serving to translate a cable remotely driving the cable drive box.

These and other features and advantages of the invention will appear from the following description which is given by way of example only, reference being had to the accompanying drawings, in which:

FIG. 3 is a side elevation of the same motion transmitting unit when fitted to a dashboard and provided with a cover plate;

FIg. 4 is a schematic side elevation of the same motion transmitting unit when provided with a wire drum and a push-pull cable;

FIG. 7 is a perspective view of the unit of FIGS. 5 and 6 when fitted with a cover plate and means for securing a steering wheel to the shaft of that unit;

FIG. 9 is a scrap, partially sectioned, side elevation of a motion transmitting unit serving as a steering head and provided with a helm indicator;

FIG. 10 is an end view of the unit depicted in FIG. 9 when deficient of the steering wheel;

FIGS. 11 and 12 are scrap sections along lines XI and XII respectively of FIG. 9;

FIG. 13 is a similar view to FIG. 9 but with the unit having an angled dashboard mounting;

FIG. 14 is a schematic plan view of a marine craft steering system employing a steering head and a cable drive box both utilizing any of the aforesaid motion transmitting units as a basic component;

In the various figures, like parts are designated by like references.

Figure 1:
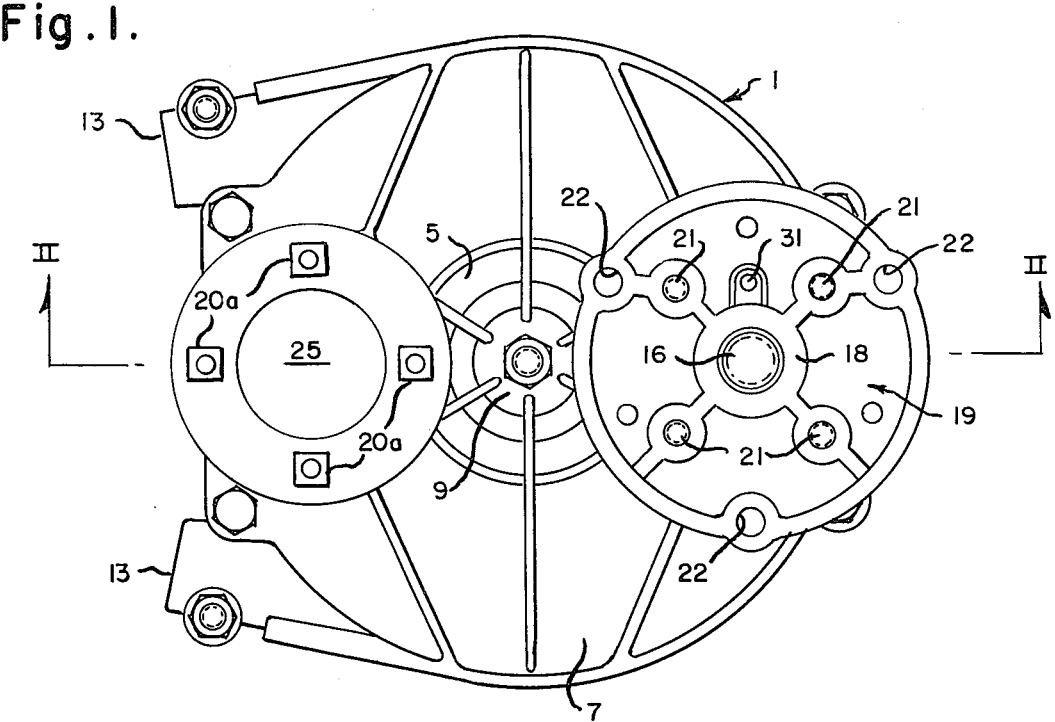
FIG. 1 is a plan view of a motion transmitting unit.
Figure 2:
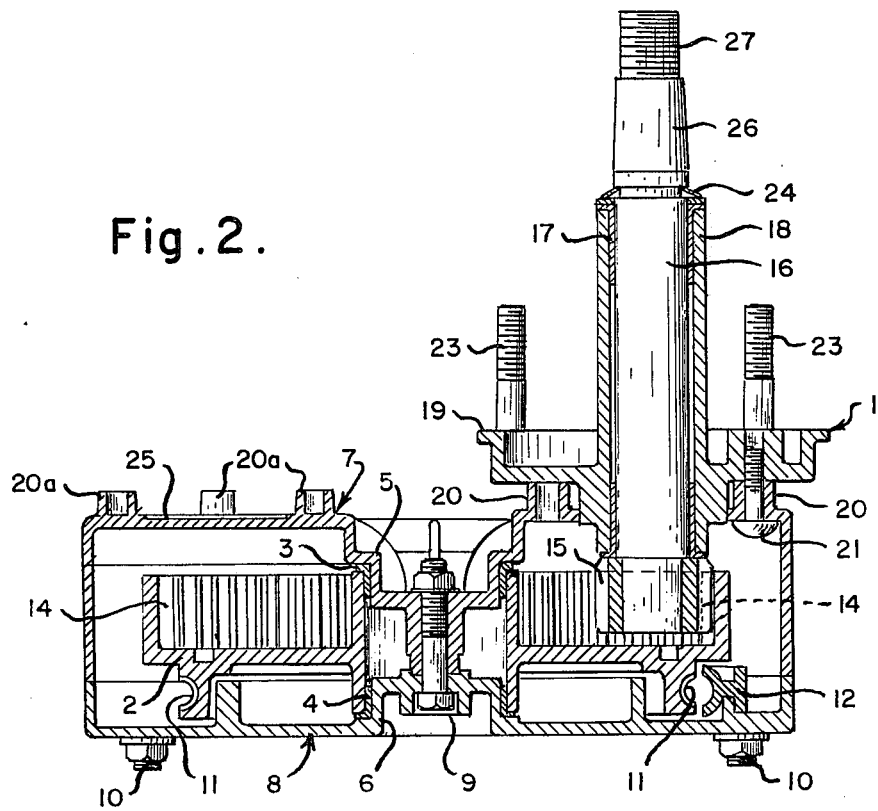
FIG. 2 is a sectioned side elevation taken along the line II—II of FIG. 1.

The motion transmitting unit 1 illustrated in FIGS. 1 and 2 comprises a cable wheel 2 which is rotatably mounted on a pair of plastics sleeves 3, 4 carried by hub portions 5, 6 respectively of respective housing halves 7 and 8 which are joined together by a central nut and bolt assembly 9 and four outer nut and bolt assemblies 10.

The cable wheel 2 is fashioned with a helically grooved annular recess 11 in its periphery which makes driving engagement with a conventional helically wound inner cable (not illustrated) and which forms part of a push-pull cable mechanism (also not illustrated) so that rotation of the cable wheel within the housing causes the cable to make translational movement. The cable is guided within the housing in a plastic insert 12 extending between two openings 13 orientated tangentially to the annular recess 11 and through which the cable moves as the cable wheel 2 rotates.

The cable wheel 2 is internally toothed at 14 for driven engagement with a pinion 15 which is fast with (as by being brazed on to) one end of a steel shaft 16. The shaft 16 is journalled for rotation in a pair of plastics sleeves 17 carried at the upper and lower ends of a horn 18 integral with a shroud 19—so that the horn and shroud together constitute a one-piece body—secured upon the housing half 7. For that purpose, the housing half 7 has a plurality (four as shown, but preferably eight) of equi-angularly spaced lugs 20, and the shroud 19 (which is fashioned as a web structure extending transversely of and from the lower region of the horn 18) has four sets of paired radial fins (not shown), the fins of each pair being spaced apart so as to fit closely upon a respective housing lug. The housing half 7 and the shroud 19 are coupled together by four screws 21 passing centrally of the paired fins and through the respective aligned lugs 20. As will be appreciated, the housing can be set in any of a multitude of angular positions about the axis of the shaft 16 to suit the angle of entry of the cable for a given mounted position of the shroud to the dashboard (not shown).

So that the shroud 19 can be mounted to the dashboard or other mounting face, the shroud is provided (in this embodiment) with three apertures 22 within which bolts 23 can pass with their hexagonal heads engaged within complementary counterbores to be restrained from rotation. The shroud 19 (with the housing coupled thereto and the shaft 16 mounted therein — and axially secured by a circlip 24) can thus be offered up to the underside of, say, the dashboard, the bolts 23 passed through appropriately formed apertures therein, and finally nuts screwed on to the threaded shanks of the bolts as emerging through the "dashboard" to hold the entire assembly thereto.

The housing half 7 also includes a knock-out plate 25 surrounded by lugs 20a to permit assembly of the shroud and shaft unit to the housing in an alternative position diametrically opposite that shown, if so wished.

The unit 1 is intended for heavy duty work, and hence the housing halves, the cable wheel and the shroud are made of cast aluminum alloy.

As so far described, the unit 1 is a basic component capable of being provided with either a steering wheel in which case to serve as a steering head or a wire drum (thus constituting a cable drive box). In either capacity, the steering wheel or the wire drum would be mounted upon the tapered section 26 of the shaft 16 and secured thereon by being bolted to the threaded end 27 thereof. When serving as a steering head, the steering wheel would, of course, be rotated to effect rotation of the cable wheel and translational movement of the push-pull cable. However, when employed as a cable drive box, the push-pull cable would be translated (as by means of the aforesaid steering head) and thereby rotate the cable wheel, and through the intermeshing pinion the wire drum secured to the pinion shaft.

To give a neat appearance to the steering head thus constructed and mounted to the dashboard (referenced 28 in FIG. 3), a dished cover plate 29 would be positioned on the front side of the dashboard to hide the nuts and bolts securing the shroud 19 thereto. The cover plate 29 would be held in position by being screwed to a lug 30 provided with a threaded hole 31 for that purpose.

Referring now to FIG. 4, the cable drive box (reference 1B) depicted therein is shown with its wire drum 32 bolted at 33, as described, to the pinion shaft. Whilst not shown, the wire drum has a depending internal hub at its top end which is shaped to mate with the shaft tapered section 26. This figure also shows the push-pull cable which is reference 34. The push-pull cable would be connected in any suitable manner to the helically wound inner cable engaging the cable wheel.

Figure 5:
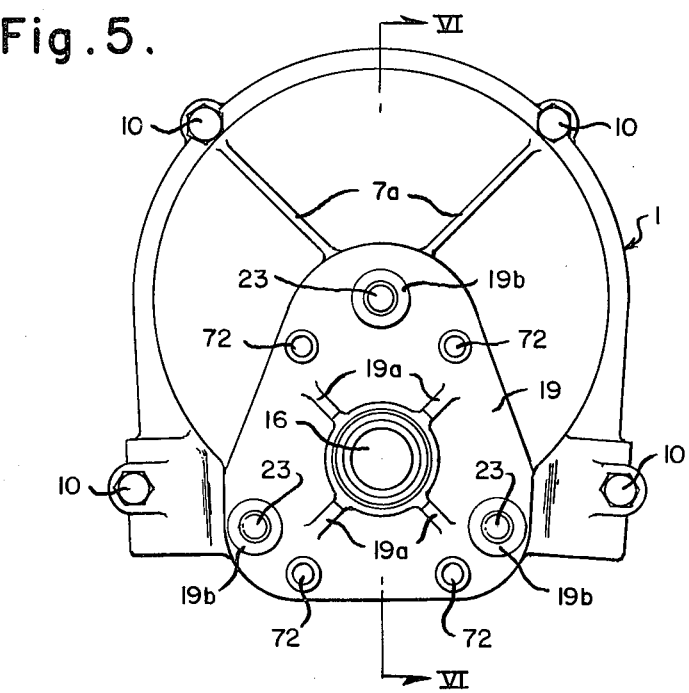
FIG. 5 is a plan view of an alternative motion transmitting unit.
Figure 6:
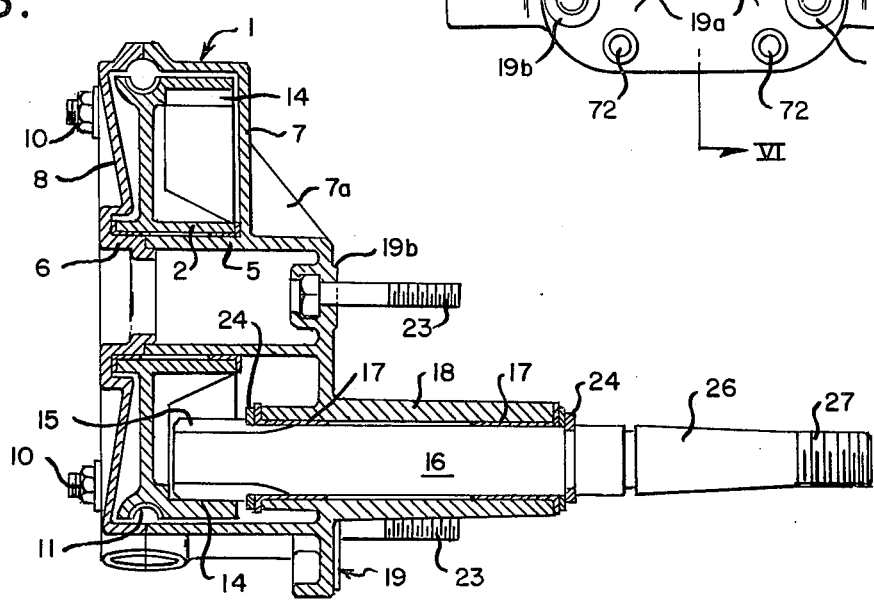
FIG. 6 is a sectioned side elevation taken along the line VI—VI of FIG. 5.

An alternative (and preferred) motion transmitting unit 1 is depicted in FIGS. 5 to 7. Whilst affording the facility of being able to be mounted to the underside of the dashboard (or other mounting face) as before, the unit is of much simpler construction than that of FIGS. 1 to 4. The present unit will be described mainly insofar as the principal differences between it and the more complicated unit are concerned.

Thus, not only is the horn 18 an integral part of a shroud 19 but the shroud is fashioned in one-piece with the upper housing half 7. By such a construction, the mating lugs 20 and paired radial fins together with the coupling screws 21 (necessary in the previous embodiment) are obviated. The shroud 19 takes the form of a web structure extending transversely of and from the lower region of the horn 18, and strengthening ribs 19a extend between and are integral with the horn and the web structure. Three countersunk bosses 19b are integral with the web structure, and in each is housed the hexagonal head of a bolt 23 so that the unit, like that previously described, can be offered up and bolted to the rear side of the mounting face such as that of the dashboard. The bosses 19b are lightly peened over so that the bolts 23 are retained in position, the peening being such that the bolts can be knocked out of the bosses when a mounting not requiring such bolts, to be later described, is to be used.

Whilst the upper housing half 7 is coupled to the lower housing half 8 by set of nuts and bolts 10 as previously, and the two halves again together provide a journal mounting for the cable wheel 2, the central nut and bolt assembly 9 is dispensed with. Therefore, the hub portions 5, 6 are fashioned differently, the former extending upwardly of the housing half 7 to form part of the shroud web structure and being braced by ribs 7a. Moreover, the extended hub portion 5 contains one of the countersunk bosses 19b.

Another, although minor, point of difference is that there are circlips 24 not only adjacent the top but also the bottom of horn 18 to axially retain the shaft 16 in position.

Figure 8:
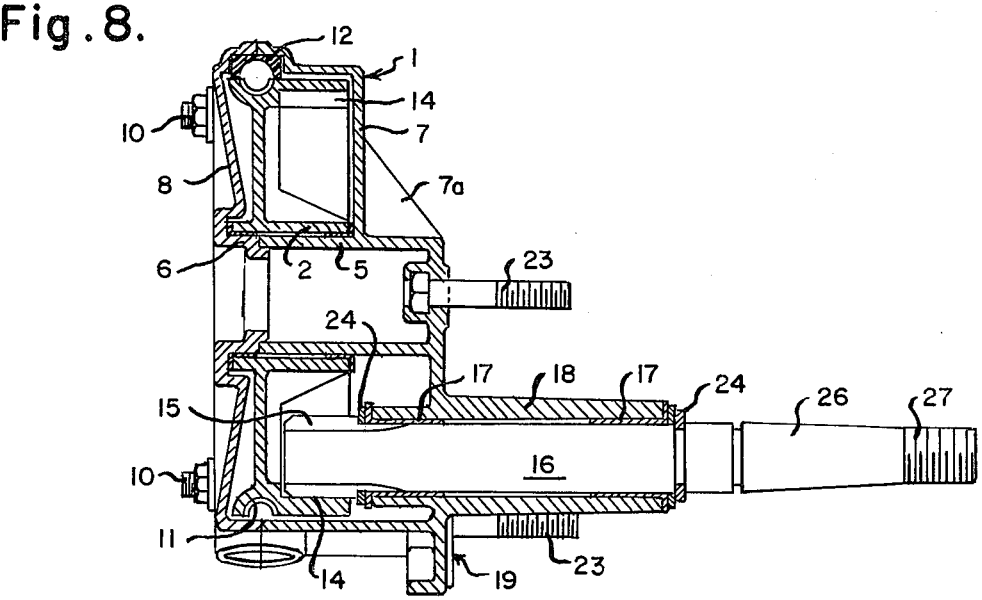
FIG. 8 is a sectioned side elevation of a further alternative motion transmitting unit albeit of very similar construction to that of FIGS. 5 to 7.

In this embodiment, there is (unlike the first) no plastics insert 12, but the third embodiment depicted in FIG. 8 does incorporate such an insert, that being the only difference of note between the two alternative units. As will be appreciated, the second described has the simplest construction of the three.

Referring now to FIGS. 9 to 12, the motion transmitting unit is indicated diagrammatically by reference numeral 1 and serves as a steering head, the bolts 23 passing through the dashboard 28 and receiving nuts 23a securing the unit to the rear or underside of the dashboard. A steering wheel 60 is suitably affixed to the shaft 16.

A scroll wheel 61 is suitably detachably affixed to the shaft 16 and has a cam groove fashioned in its inner face 62 within which rides a dimple 63 at the lower end of a rudder indicator 64. The indicator is pivoted at 65 to a damper block 66 (which is preferably a plastics moulding) which is keyed to the horn 18 on ribs 18a thereof. The arrangement is such that the rudder indicator 64 turns about its pivot as the steering wheel is rotated to indicate the degree of turn given to the rudder through a suitably marked window cowl 67 affixed to or integral with a cover plate or bezel 29 attached by screws 68 to the dashboard.

The damper block 66 is split at its front end into ears 66a, 66b which are mounted upon the shaft 16, and a threaded shank 69 having a keyhead 70 at its outer end and extending through the bezel 29 to pass through the ear 66b and screw into the ear 66a serves, upon being rotated, to vary the degree by which the ears grip the shaft 16. Thus, a means is provided to impart variable frictional resistance to rotation of the steering shaft 16 and thus serve as a damper with respect thereto.

In FIG. 13, the steering head 1 is to be mounted at an angle to the dashboard 28. For this purpose, the bolts 23 are removed and an angle bracket 71 is affixed by screws engaged in holes 72 (see FIGS. 6 and 7) in the shroud web structure 19. The bracket 71 is also bolted at 73 to the dashboard 28. A rudder indicator may also be provided, as in the construction of FIGS. 9 to 12.

It will be realized that each of the alternative motion transmitting units can accept a wire drum (as shown in FIG. 4) and so serve as a cable drive box.

In the marine craft steering system depicted in FIG. 14, the steering head, constructed in any of the manners described, is referenced 1A and is operatively linked by the push-pull cable 34 to the cable drive box 1B, again constructed in any of the described manners. That box is located in proximity to a tiller 35. A continuous wire 36 would about the wire drum 32 and trained around an adjustable sheave 37 constitutes therewith a short, closed twin tension wire circuit, the wire being suitably coupled at 38 to the tiller 35 so that translation of the wire, as the wire drum rotates, effects pivotal steerage motion of the tiller.

The described steering system has various desirable features. Thus, the principal length of cable run is that of the push-pull cable (from the steering head to the cable drive box). A push-pull presents no problem as regards its guidance, it merely being necessary to provide a suitable channel or conduit therefor. In comparison, a cable wire motion transmitting system extending over a long tortuous path requires a multitude of pulleys, pulley mountings, fairheads etc., which introduce cable lash and its attendant problems. In the present system, the extent of cable wire (i.e., that in the closed circuit) is kept to a minimum, such being possible by locating the cable drive box close to the tiller. The present system thus has advantages over one using a cable wire drive (over pulleys) direct from the steering head.

Another advantage (over a system using a push-pull cable drive from the steering head to a conventional telescopic steering arrangement in the vicinity of the tiller) is that the "final" closed wire circuit need only occupy a relatively compact space, the degree of room required being constant and not increasing as the steering system is operated. On the contrary, a telescopic construction inherently extends during operation and when fully extends needs twice the room as when retracted. A further advantage over the telescopic arrangement is that therewith the output is linearly proportional to the input giving a restricted steering ratio, whereas utilization of the final wire drive with the wire drum (in combination with the push-pull cable) enables the steering ratio to be selected as required. The present system, in fact, provides for five turns of the steering wheel which is not obtainable with a 'telescopic' push-pull mechanism.

A further advantage over 'conventional' push-pull systems is that with the 'hybrid' push-pull final cable wire drive arrangement, lost motion in the system can be eliminated giving, it has been found, a 5 percent gain in efficiency.

Figure 15:
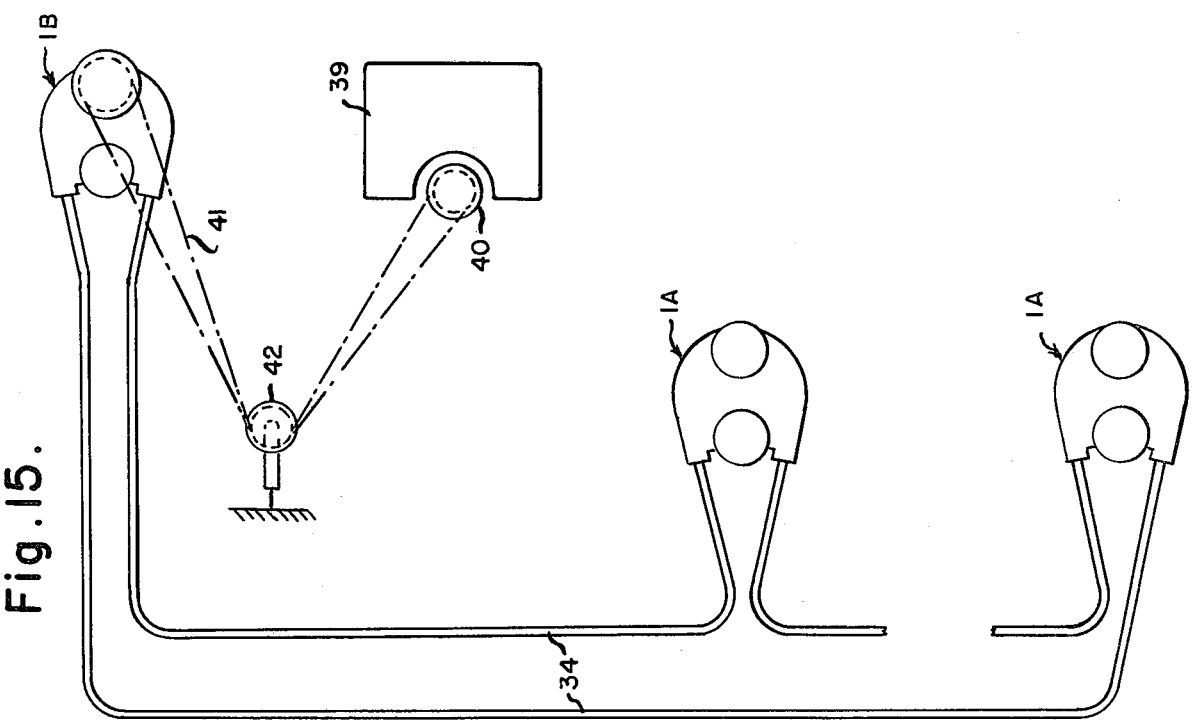
FIG. 15 is a schematic plan view of another marine craft steering system employing dual steering stations and a single out drive.

An alternative steering system, shown in FIG. 15, has been devised for steering a conventional outdrive 39 incorporating a pulley wheel 40 serving to effect steerage through a steering shaft, pinion drive and worm and wormwheel. In this system, a pair of steering heads 1A (one for operation from the saloon and the other from the bridge) are provided which are interconnected in a push-pull cable (again referenced 34) mechanism with a cable drive box 1B. Here, turning of the steering wheel of either of the steering heads effects translation of the push-pull cable which, in turn, rotatably drives the wire drum 32 of the cable drive box. In this instance, the wire drum is operatively connected by a wire 41 wound thereabout and trained around an adjustable sheave 42 (suitably mounted on the boat structure) to the outdrive pulley wheel 40, so that rotation of that wheel and its associated steering mechanism will take place. Again, therefore, the enumerated advantages of a combination push-pull/cable wire drive are obtained.

Figure 16:
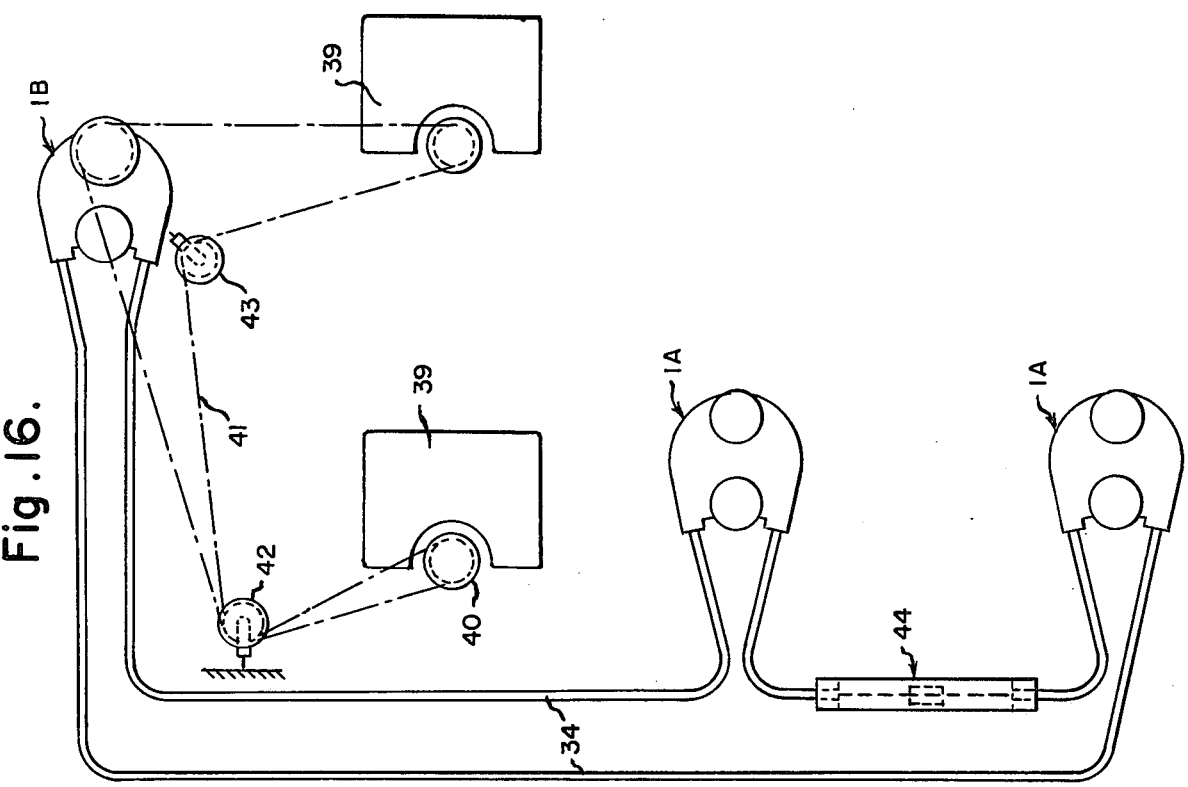
FIG. 16 is a view similar to FIG. 15 but showing twin out drives.

The steering system of FIG. 16 is similar to that of FIG. 15, differing therefrom only in that twin outdrives 39 are provided, the wire 41 being wound about the pulley wheel 40 of each and additionally trained therebetween around an adjustable jockey pulley 43. The outdrives are operated simultaneously upon steering motion applied to one or the other steering heads.

Figure 17:
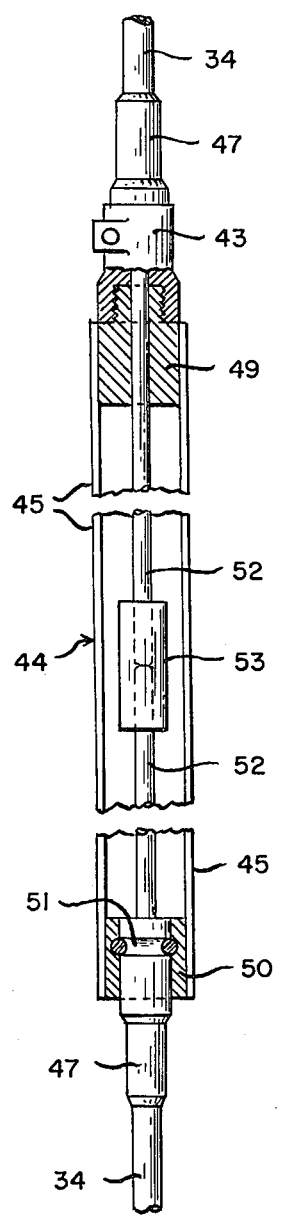
FIG. 17 is a plan view of a circuit coupling incorporated in the system of FIG. 16.
Figure 18:
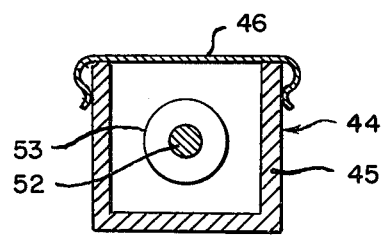
FIG. 18 is an end view of the same circuit coupling.

In the FIG. 16 system it is advantageous to couple the free ends of the push-pull cable 34, rather than leaving them free as in the system of FIG. 15, so that the cable circuit is closed. One suitable circuit (or cable) coupling is depicted in FIGS. 17 and 18.

The circuit coupling 44 comprises a channel body 45 closed by a snap-on cover 46. The upper (as viewed in the figure) cable 34 has a standard hub 47 rotary swaged on to the cable casing and affixed to ferrule 48 screwed on to a threaded block 49 fast in one end of the channel body. Thereby, the ferrule 48 may be adjusted lengthwise to effect consequential adjustment of the tension in the push-pull cable circuit. The lower cable 34 is similarly affixed to a standard hub 47, but in this case the hub is mounted direct in a lower block 50 fast in the other end of the channel body 45. A conventional bolt/annular recess (referenced 51) arrangement is provided to secure the lower hub 47 from rotation. The ends of the cable core 52 are joined within the housing by any suitable cable clamp 53 shown only diagrammatically. By so making the push-pull circuit a closed one, backlash is completely eliminated.

Whilst not essential, it is preferred that the push-pull cable be of a construction having a casing within which the core can slidably reciprocate, the casing being formed of a plurality of casing wires laid contiguously, in the manner of a long pitched helical coil, about the peripheral surface of an inner, flexible plastics tube (within which the core is guided), an outer plastics jacket encasing the coil of wires.

Though it be advantageous to utilize in the described steering systems any of the constructions of steering head and cable drive box disclosed herein, it is envisaged that such constructions could be departed from and yet the advantages of the combined push-pull/wire drive system still be obtained. Clearly, the steering head would need to be so constructed as to cause translation of the push-pull cable, and the cable drive box also constructed with a wire drum rotatable by translation of that cable. However, within that frame of reference other constructions of the components in question could be devised and utilized, whilst still affording the advantages gained by remote steering wheel/push-pull cable operation coupled with wire cable drive only in the proximity of the tiller.

What I claim is:

1. A ship's steering system motion transmitting unit comprising a housing, a cable wheel mounted within said housing, a shaft with a pinion thereon which makes driving engagement with said cable wheel, means connecting the shaft to a ship steering device, and a one-piece body which serves as a bearing support for said shaft and which also has a shroud portion providing a mounting means for mounting said unit to a support surface whereby when said unit is orientated with its housing lowermost, the shroud portion and mounting means are spaced below the upper region of said shaft and said bearing support therefor.

2. A ship's steering system unit according to claim 1, including a rudder indicator spaced from said shroud and said mounting means upon said shaft being turned to indicate the degree of turn given to the rudder.

3. The ship's steering system motion transmitting unit of claim 1 wherein the ship steering device comprises a steering head remotely controlling by means of a push-pull cable a cable drive box, said cable drive box comprising a housing, a cable wheel mounted within said housing, a shaft with a pinion thereon which makes driving engagement with said cable wheel, means connecting the shaft to a second ship steering device, and a one-piece body which serves as a bearing support for said shaft and which also has a shroud portion providing a mounting means for mounting said cable drive box to a support surface whereby when said said cable drive box is orientated with its housing lowermost, the shroud portion and mounting means are spaced below the upper region of said shaft and said bearing support therefor, and wherein the second steering device is a wire drum mounted on the shaft, the wire drum being located in proximity to a member of a marine craft requiring, in operation, to be turned and being operatively connected to that member by an endless drive wire.

4. A ship's steering unit comprising a housing, a cable wheel mounted within said housing, a shaft with a pinion thereon which makes driving engagement with said cable wheel, means connecting the shaft to a ship steering device, and a one-piece body which serves as a bearing support for said shaft and which also has a shroud portion providing a mounting means for mounting said unit to a support surface whereby when said unit is orientated with its housing lowermost, the shroud portion and mounting means are spaced below the upper region of said shaft and said bearing support therefor, including a rudder indicator spaced from said shroud and said mounting means upon said shaft being turned to indicate the degree of turn given to the rudder including a scroll wheel secured for rotation with said shaft within which a follower fast with said rudder indicator runs to cause pivotal movement thereof upon turning of said shaft.

5. A steering unit according to claim 4, wherein said rudder indicator is pivoted to a member secured to said bearing support.

6. A steering unit according to claim 5, wherein said member has a region mounted on said shaft and which can be closed and opened to provide a variable degree of frictional resistance to turning of said shaft.

7. A steering unit according to claim 6, wherein said region includes a pair of ears receiving a screw threaded means which upon being turned urges one of said ears either towards or away from the other and hence causes said closing or opening movement of said region relative to said shaft.

8. A marine craft steering system comprising a steering head unit having a rotatable cable wheel, a steering shaft, a pinion mounted on the shaft driven by the shaft and making driving engagement with said cable wheel such that rotation of said cable wheel effects translational movement of a push-pull cable, and a cable drive box located in proximity to a member of the marine craft requiring, in operation to be turned, said cable drive box having a similar second rotatable cable wheel in driven engagement with said cable such that said translation thereof effects rotation, a second similar pinion driven by the second wheel, a second shaft connected to the second pinion of that cable wheel, said driven cable wheel serving to drive a wire drum which is operatively connected via an endless drive wire to said turnable member such that rotation of said wire drum effects turning of said turnable member.

9. A steering system according to claim 8, wherein said drive wire is trained around an adjustable sheave to constitute therewith and with said wire drum a short, closed twin tension wire circuit, the wire being connected to said turnable member at a point intermediate said sheave and said wire drum.

10. A steering system according to claim 9, wherein said turnable member comprises tiller.

11. A steering system according to claim 8, wherein said cable drive box is remotely controlled from one or the other of a pair of said steering head units via said push-pull cable, said endless drive wire being trained around a sheave and an outdrive pulley wheel serving to effect steerage.

12. A steering system according to claim 11, wherein a pair of outdrives are provided, each with its own pulley wheel, and wherein said endless drive wire is additionally trained between said pulley wheels around an adjustable jockey pulley.

13. A steering system according to claim 11, including means coupling the ends of said push-pull cable whereby the push-pull cable forms a closed circuit.

14. A steering system according to claim 13, wherein said coupling means is adjustable to vary the tension in the push-pull cable circuit.

* * * * *